US00RE36793E

United States Patent [19]

Barron et al.

[11] E Patent Number: Re. 36,793

[45] Reissued Date of Patent: Jul. 25, 2000

[54] STABILISED OLEFIN CARBON MONOXIDE COPOLYMER COMPOSITIONS

[75] Inventors: Andrew Ross Barron, Cambridge, Mass.; Neil Shearer Davidson, Stirling; Brian Kneale, Woking, both of United Kingdom

[73] Assignee: BP Chemicals Limited, London, United Kingdom

[21] Appl. No.: 09/161,221

[22] Filed: Sep. 25, 1998

Related U.S. Patent Documents

Reissue of:

[64] Patent No.: 5,527,851
Issued: Jun. 18, 1996
Appl. No.: 08/252,936
Filed: Jun. 2, 1994

[30] Foreign Application Priority Data

Jun. 16, 1993 [GB] United Kingdom ..... 93/2356

[51] Int. Cl.[7] ..... C08K 3/22
[52] U.S. Cl. ..... 524/437
[58] Field of Search ..... 524/437

[56] References Cited

U.S. PATENT DOCUMENTS

| | | |
|---|---|---|
| 4,492,682 | 1/1985 | Trebillon . |
| 4,555,394 | 11/1985 | Asaoka et al. . |
| 4,562,059 | 12/1985 | Asoka et al. . |
| 4,761,448 | 8/1988 | Kluttz et al. . |
| 4,994,513 | 2/1991 | Syrier et al. . |
| 5,122,565 | 6/1992 | George . |
| 5,232,968 | 8/1993 | Davidson . |
| 5,508,329 | 4/1996 | Dolden et al. . |
| 5,527,851 | 6/1996 | Barron et al. . |

FOREIGN PATENT DOCUMENTS

| | | |
|---|---|---|
| 085592 | 1/1983 | European Pat. Off. . |
| 310166 | 9/1988 | European Pat. Off. . |
| 326224 | 1/1989 | European Pat. Off. . |
| 478088 | 9/1991 | European Pat. Off. . |
| 085592 | 1/1992 | European Pat. Off. . |
| WO 93/01239 | 1/1993 | United Kingdom . |

OTHER PUBLICATIONS

Wefers & Misra "Oxides and Hydroxides of Aluminum" Alcoa Technical Paper No. 19, pp. 1–10, 15–17, 48–50, 1987.

*Primary Examiner*—Veronica P. Hoke
*Attorney, Agent, or Firm*—Fay, Sharpe, Fagan, Minnich & McKee, LLP

[57] ABSTRACT

Polymer compositions which comprise (a) a major amount of a polymer of carbon monoxide and at least one olefin and (b) a minor amount of a pseudoboehmite are stabilised against degradation in melt processing. The polymer is suitably a polyketone.

11 Claims, No Drawings

STABILISED OLEFIN CARBON MONOXIDE COPOLYMER COMPOSITIONS

Matter enclosed in heavy brackets [ ] appears in the original patent but forms no part of this reissue specification; matter printed in italics indicates the additions made by reissue.

The present invention relates to a stabilised polymer composition containing a polymer of carbon monoxide and one or more olefins. In particular the invention relates to compositions containing such polymer which exhibit good melt processing stability in processes during which the composition is melted and subsequently solidified.

The preparation of random copolymers comprised of a minor amount of carbon monoxide and a major amount of ethylene by catalysed radical polymerisation has been known for some years. More recently it has been found that linear alternating polymers of carbon monoxide and one or more olefins, hereafter called polyketones, can be prepared by contacting the reactants with a Group VIII metal catalyst preferably comprised of palladium and a bidentate phosphine, see for example EP 121965.

Polyketones whilst being thermoplastics, suffer from the disadvantage that they have relatively high melting points which are close to the temperatures at which they undergo chemical degradation. This causes a problem since the materials are thus difficult to process using conventional melt processing technology.

In order to overcome this problem a number of potential approaches have been explored. EP213671 teaches that polyketones comprised of carbon monoxide, ethylene and alpha olefin (e.g. propylene) units have lower melting points than corresponding copolymers of ethylene and carbon monoxide comprised only of carbon monoxide and ethylene units and can thus be processed at lower temperatures where the rate of thermal degradation is slower. Whilst this approach goes some way to alleviating the problem, there is still a need to improve further the melt processing stability of polyketones if they are to be processed on a commercial scale.

Methods of further improving melt processability have centred around a) the blending of polyketones with other polymers, b) the addition of plasticisers and c) the use of additives claimed to interfere with the degradation reactions which the polyketones undergo. The first two types of approach suffer in that relatively large amounts of the second polymer or plasticiser are required, a consequence of which is that there is a general deterioration in the physical, mechanical and barrier properties of the polyketone. An example of the third type of approach is disclosed in EP 310166. This patent teaches the addition of an aluminium alkoxide or a derivative thereof. Examples of preferred additives are those having the general formula $Al(OR)_3$ where each R is independently $C_1$ to $C_{12}$ alkyl. It is stated in EP 310166 that the precise form of the aluminium species present in the final composition is not known with certainty and may depend upon a number of factors.

It is further disclosed in EP 326224 that aluminium hydroxide in its various forms optionally with other aluminium oxygen compounds such as in natural boehmite can be used to improve melt-processability.

It has now been found that the melt processability of polyketones can be improved by the addition of a pseudoboehmite.

According to the present invention there is provided a polymer composition which comprises (a) a major amount of a polymer of carbon monoxide and at least one olefin, and (b) a minor amount of a pseudoboehmite.

By the term polymer of carbon monoxide and at least one olefin mentioned above is meant any polymer containing units derived from carbon monoxide on the one hand and units arising from the olefin(s) on the other. This definition includes both random polymers produced by radical polymerisation and the polyketones referred to above. However the use of the combination of the stabilisers defined above is particularly effective when applied to polyketones. For the purposes of this patent, polyketones are defined as linear polymers having an alternating structure of (a) units derived from carbon monoxide and (b) units derived from one or more olefins. Suitable olefin units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of etheylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30.

The polyketones described above are suitably prepared by the processes described in EP121965 or modifications thereof. In general terms, this comprises reacting carbon monoxide and the chosen olefin(s) at elevated temperature and pressure with a catalyst which is preferably comprised of palladium, a bidentate phosphine, such as bis (diphenylphosphino)propane, and an anion which either does not coordinate to the palladium or coordinates only weakly. Examples of such anions include p-toluenesulphonate, tetrafluoroborate, borosalicylate and the like. The process is suitably carried out at a temperature in the range 50° to 150° C., a pressure in the range 25 to 75 bar gauge and in a solvent such as methanol, acetone, THF or the like.

As regards component (b) of the polymer composition, this is a pseudoboehmite. Pseudoboehmite is an aluminium oxy-hydroxide which is in a form where it has the basic boehmite structure but is less ordered, such as can be produced synthetically from aluminium hydroxide sols. It is also known as gelatinous boehmite or poorly crystalline boehmite. In the case of an extremely disordered structure, the pseudoboehmite can appear amorphous, i.e. it will lack sufficient long range order to produce an X-ray diffraction pattern. Generally pseudoboehmite contains more water than the 15% by weight corresponding to the simple oxy-hydroxide formula $Al_2O_3.H_2O$.

It is a feature of pseudoboehmites that they have a small crystallite size and large surface area. The crystallite size will typically be less than 200 Å, preferably less than 150 Å for example 20–120 Å. The surface area will typically be greater than $120m^2g^{-1}$ preferably greater than $150m^2g^{-1}$ for example $150–400m^2g^{31\ 1}$. Pseudoboehmites are further discussed in "Oxides and Hydroxides of Aluminium" (Technical Paper No.19) by K. Wefers, C. Misra produced by the Alcoa Company of America in 1987. Pseudoboehmites are available commercially from a variety of sources for example from La Roche (Versal 250, 450, 850, 900); Condea Chimie (Pural NF, Pural SB, Dispersal); American Cyanamid (SN 7189, 6973). They can be produced from a variety of starting materials for example from sodium aluminate (Versal 250, 450, 850, 900), from aluminium alkoxide (Pural 5 NF, Pural SB, Dispersal) and from burning aluminium (SN 7189, 6973). The term pseudoboehmite as used herein is understood to also include amorphous pseudoboehmite.

The amount of pseudoboehmite used will be such as to stabilise the polymer against degradation during melt processing and should be in the range 0.1 to 10 parts per hundred parts of the total composition, preferably 0.3 to 3, most preferably 1.0 to 2.0.

The pseudoboehmite can be incorporated into the polyketone by essentially any known method provided that intimate mixing is achieved. For instance, providing they do not interfere with the polymerisation reaction they could be incorporated into the polymerisation mixture prior to or during polymerisation. Alternatively, they can be mixed with the polymer after polymerisation is complete by direct mixing with the polymer produced or by adding as a solution/dispersion in a suitable solvent which is subsequently volatilised out of the composition.

For example the pseudoboehmite can be incorporated by blending finely divided stabiliser with polyketone powder in a high speed mixer (e.g. Papenmeir Universal High Speed Mixer). In such cases, blending should preferably be carried out with mixing at a speed of 1000 to 2500 rpm. Intimate mixing is then achieved when the polymer is molten by shearing in a batch mixer or continuous extruder.

The pseudoboehmite can be used in "wet" polymer where the polymer has been exposed to a moist atmosphere, alternatively it can be used in "dry" polymer where the polymer has been specifically dried typically at elevated temperature and reduced pressure. It is an advantage of using pseudoboehmites that no in-situ hydrolysis of the additive is necessary for the additive to be effective.

In addition to the components defined above the composition may contain other additives such as antioxidants, blowing agents, UV stabilisers, fire retardants, mould release agents, lubricants/processing aids, fillers and other materials conventional in the art. The composition can also be a blend of polyketones with other known commercial thermoplastics.

The compositions of the present invention may be readily melt processed and hence can be used in the manufacture of containers for food and drink, automotive parts, wires, cables and structural items for the construction industry, The following Examples now illustrate the invention.

The polyketone used in the following experiments was a terpolymer of etheylene, propylene and carbon monoxide having the following characteristics:

| | |
|---|---|
| Wt % propylene in polymer: | 5.3 mole % |
| Density of powder (g $cm^{-3}$): | 0.385 |
| Melting Point: | 206° C. |
| MFR (240° C., 5 kg): | 12 g/10 min |

Barbender Processing Test

The crosslinking reactions of polyketones in the melt lead to increased viscosity which for a mixer operating at constant speed (r.p.m.) lead to increased torque on the motor. This provides a simple method for monitoring the degradation of polyketone in the melt and for comparing the effect of additives as stabilisers under mild shear conditions.

The apparatus used was a Brabender Plastograph bench scale internal mixer. The chamber capacity was around 30$cm^3$ and 36 g polyketone were required to fill it. The rotors used were roller mixers type 30. The rotor speed was 30 r.p.m. during charging of the polymer into the chamber and 60 r.p.m. during the actual experimental run. The motor torque was monitored mechanically directly on a chart recorder throughout each run. Processing was carried out under nitrogen: the gas flow was directed through the back of the rotor shafts and over the top of the mixing chamber. The temperature of the mixing chamber prior to addition of the polymer was 217±2° C. The polymer temperature during processing was monitored by a thermouple located through the base of the mixing chamber in intimate contact with the polymer melt.

The polymer powder and the additive were mixed in a beaker immediately prior to processing. The powder mixture was slowly added directly to the mixing chamber over a period of 3–4 minutes with care being taken to avoid very high initial torque. For most runs 1 pph Irgawax 371 (an oxidised polyethylene wax) was added as a mould release agent to assist removal of the polymer at the end of the test. Torque and melt temperature were monitored with time from the point all the material was charged and the ram located in position.

Initially the torque is high as the polymer fuses, then it falls as the polymer fully melts and the temperature equilibriates and subsequently the torque and melt temperature rise as the effect of polymer crosslinking dominates. Limitation of such torque and melt temperature increases compared to those found for the base polymer by an additive are indicative of a stabilising effect. The minimum torque, the final torque at end of the test and the final melt temperature were specifically used in comparing the effect of different additives. The standard residence time was 30 minutes. After each test the polymer was recovered, ground into small pieces and the melt flow rate (MFR) determined for each sample. The melt flow rate was measured using a Davenport Melt Index Tester operating at 240° C. The melt flow was taken as the material extruding over 30 seconds, 3 minutes after charging the polymer into the barrel of the instrument at temperature, on application of a given load. Otherwise standard procedures were followed (ASTM D1238-86). Following usual convention the MFR was expressed as the weight extruding (g) over 10 minutes. The better the MFR retains its value after a processing/thermal history with respect to its initial value the greater the resistance to degradation. Crosslinking results in a reduction of MFR. The results are given in Table 1.

TABLE 1

| | Compound | Type | Source | Minimum Torque (Nm) | Maximum Torque (Nm) | Melt Temp. (° C.) | Resultant MFR (g/10 min) 5 kg |
|---|---|---|---|---|---|---|---|
| Comp. Test 1 | None | | | 9.0 | 15.1 | 229 | No flow |
| Example 1 | Versal 900 | p-bochmite | La Roche | 6.1 | 7.2 | 221 | 2.8 |
| Example 2 | Versal 450 | p-bochmite | La Roche | 5.1 | 5.6 | 224 | 4.9 |
| Example 3 | Versal 250 | p-bochmite | La Roche | 5.3 | 6.0 | 226 | 5.1 |
| Example 4 | SN 7190 | p-bochmite | Am. Cyanamid | 7.2 | 8.5 | 220 | 3.8 |

TABLE 1-continued

| | Compound | Type | Source | Minimum Torque (Nm) | Maximum Torque (Nm) | Melt Temp. (° C.) | Resultant MFR (g/10 min) 5 kg |
|---|---|---|---|---|---|---|---|
| Example 5 | SN 6953 | p-bochmite | Am. Cyanamid | 5.6 | 6.3 | 224 | 5.0 |
| Example 6 | SN 7189 | p-bochmite | Am. Cyanamid | 5.7 | 6.3 | 222 | 4.9 |
| Comp. Test 2 | Cera Hydrate | bochmite | BA Chemicals | 7.9 | 14.3 | 234 | No flow |
| Comp. Test 3 | Versal H | buycrite | La Roche | 6.1 | 9.3 | 224 | 0.5 |
| Comp. Test 4 | Versal GL | γ-alumina | La Roche | 5.8 | 6.9 | 230 | 2.1 |
| Comp. Test 5 | Versal GH | γ-alumina | La Roche | 5.8 | 10.8 | 231 | 0.4 |
| Comp. Test 6 | CP 2 | γ-alumina | Alcoa | 7.4 | 13.5 | 229 | No flow |
| Comp. Test 7 | Puralox SCCa | γ-alumina | Condea | 6.2 | 12.5 | 232 | No flow |
| Comp. Test 8 | Catapal | γ-alumina | | 6.2 | 7.8 | 226 | 2.0 |

The results in Table 1 show that pseudoboehmite from a variety of sources has a significant stabilising effect on the polyketone. Their performance as measured by the Brabender test was superior to a wide range of other aluminium oxides and hydroxides, including natural boehmite and bayerite.

We claim:

1. A polymer composition which comprises (a) a major amount of a polymer of carbon monoxide and at least one olefin and (b) a minor amount of a pseudoboehmite*, and providing that an aliphatic amine is not present in the composition*.

2. A polymer composition as claimed in claim 1 wherein the polymer of carbon monoxide and at least one olefin is a polyketone.

3. A polymer composition as claimed in claim 2 wherein the polyketone is a terpolymer of carbon monoxide, ethylene and propylene.

4. A polymer composition as claimed in claim 1 wherein the pseudoboehmite has a crystallite size of less than 200 Å.

5. A polymer composition as claimed in claim 4 wherein the pseudoboehmite has a crystallite size of less than 150 Å.

6. A polymer composition as claimed in claim 5 wherein the pseudoboehmite has a crystallite size in the range 20–120 Å.

7. A polymer composition as claimed in claim 1 wherein the pseudoboehmite has a surface area greater than 120 $m^2g^{-1}$.

8. A polymer composition as claimed in claim 7 wherein the pseudoboehmite has a surface area in the range 150–400 $m^2g^{-1}$.

9. A polymer composition as claimed in claim 1 wherein the amount of pseudoboehmite is in the range 0.1 to 10 parts per hundred parts of the total composition.

10. A polymer composition as claimed in claim 9 wherein the pseudoboehmite is present in the composition in the range 1.0 to 2.0 parts per hundred parts of the total composition.

*11. A polymer composition consisting essentially of (a) a major amount of a polymer of carbon monoxide and at least one olefin and (b) a melt processing stabilizer in the form of a minor amount of pseudoboehmite and optionally (c) antioxidants, blowing agents, UV stabilizer, fire retardants, mold release agents, lubricants, processing agents and fillers.*

* * * * *